United States Patent Office 3,231,483
Patented Jan. 25, 1966

3,231,483
POLYMERIZATION OF POLYETHYLENE IN THE PRESENCE OF A METAL OXIDE ON AN ALUMINA CATALYTIC SUPPORT
Sherwood M. Cotton, Harvey, Ill., assignor to Sinclair Research, Inc., Wilmington, Del., a corporation of Delaware
No Drawing. Filed July 10, 1962, Ser. No. 208,945
8 Claims. (Cl. 204—162)

This invention relates to an improved method for the polymerization of olefins. In particular, the present invention relates to the conversion of ethylene by high energy radiation and certain solid catalysts. More particularly the present invention relates to the polymerization of ethylene to high molecular weight polymers under the influence of defined polymerization catalysts and a relatively total low dosage of ionization radiation, such as gamma rays.

Polymers of ethylene are of great commercial importance. The normally solid thermoplastic polymers melting above about 110° C. and having a molecular weight of from 6,000 up to several hundred thousand or more, and often showing the presence of a crystalline phase by X-ray diffraction, is known commercially as polyethylene, and is used in the form of films, filaments and articles made by injection and compression molding. It is also useful as an electrical insulator and as a fabricating material. Lower molecular weight ethylene polymers of the nature of semi-solid to solid waxes also find uses such as in coatings and polishes.

It is well known that various types of unsaturated organic compounds can be polymerized to produce valuable resins and liquids. Many of these polymerizations are believed to be promoted by the action of free radicals which are usually produced by a catalyst in the system. It is also known that the polymerization of olefins can be promoted by subjecting the material to be polymerized to the action of high energy ionization radiation, such as gamma radiation. The art has suggested that the polymerization of olefins can be accomplished by the addition of a promoter, such as a catalyst, to the high energy, ionization radiation system. However, in practice these polymerization methods have not been found to be efficient, i.e. the utilization of the ionization radiation in the presence of catalytic promoters has not been as effective as commercially desired.

In accordance with the present invention, it has been discovered that in polymerization systems of the latter type the ethylene polymerization reaction can be carried out much more efficiently with a significant increase in the rate of ethylene polymerization when a specific type of solid catalyst, in contact with the ethylene, is exposed to a relatively small dose of high energy ionization radiation. The polymerization of ethylene is accomplished in the present invention at a rate which is substantially greater that that in the prior art methods by using a particularly effective catalyst comprising the oxides of platinum, titanium and/or chromium in catalytic amount in combination with an alumina or silica-alumina support and a relatively small dose of ionization radiation. Chromium is a less preferred metal. Generally, in the catalyst, platinum is present in amounts from about 0.01 to 4, preferably about 0.2 to 2, weight percent; titanium in amounts from about 1 to 20, preferably about 4 to 8, weight percent; and chromium in amounts from about 0.5 to 15, preferably about 1 to 5, weight percent. The effectiveness of the catalyst is dependent on the amount of metals and increases up to about 2% for platinum, 5% for titanium and 5% for chromium. As will be shown in the data presented below the use of the oxides of platinum, titanium or chromium on an alumina or silica-alumina support in the polymerization of ethylene in the presence of a relatively low total dosage of irradiation is particularly effective for increasing the polymerization rate. The efficiency of the polymerization system is measured in G values, which are the number of molecules of ethylene converted per 100 electron volts of energy absorbed and are an indication of the efficiency of the utilization of the radiant energy. The G value is inversely proportional to the square root of the dose rate for the system. The higher the G value, the more efficient the polymerization system.

An important aspect of the present invention is the radiation dose, which here is expressed in REP (Roentgen equivalent physical, being equivalent to 93 ergs per gram of absorber). In order to effectuate the purpose of this invention, the total dose should fall within the range of about $1 \times 10^4$ to $3 \times 10^6$ REP, preferably about $2 \times 10^5$ to $15 \times 10^5$ REP. This dose may be imparted to the feedstock in one pass or in a series of passes through the catalyst-containing radiation zone. The rate of dosage can affect the efficiency of the system as will be shown in the data presented hereinafter. Thus, a low dose of about $1 \times 10^4$ to $3 \times 10^5$ REP/hr. is very effective in improving the rate of polymerization and the efficiency in the utilization of the radiation energy is greatly increased over the use of a higher dose of, for instance, above about $3 \times 10^5$. The dose rate received by the reactant and catalyst is usually not above about $1 \times 10^7$ REP/hour.

Various ionizing radiations can be employed for the purpose of the present invention, for example gamma- or X-rays, beta-rays (high speed electrons) and various densely ionizing particles such as neutrons, protons, deuterons, alpha particles, etc. The preferred form of radiation is gamma-radiation obtained from radioactive materials. One very convenient form is cobalt-60 which can be readily obtained by subjecting ordinary cobalt-59 metal to irradiation in an atomic pile. Cobalt-60 has a half-life of 5.3 years, and emits gamma-radiation of 1.33 and 1.17 m.e.v. (million electron volts).

Numerous other gamma-emitting radioisotopes available from chain reacting piles and cyclotrons can also be used. Other materials providing gamma-radiation include low cost fission products from nuclear reactors or reactor per se. Choice of a particular source of gamma-radiation will depend upon availability, expense, intensity and the convenience of handling. For instance, a Van de Graaf linear accelerator with conversion of electrons to X-ray by use of a gold target may be used. A 14,000 curie source of cobalt-60 was used in obtaining the particular data set forth hereinbelow. Green fuel elements from an atomic pile make a convenient source of gamma-radiation; green fuel elements are made up of the initial radioactive material charged to the atomic pile, e.g. uranium-235, having associated therewith the various products of radioactive decay, and such elements are highly radioactive and are normally stored for a considerable length of time before chemical processing is attempted. The radiation energy being emitted during such time is normally wasted, and can be used to advantage in the present invention. The ethylene polymerizations of the present invention can, if desired, be effected in an atomic pile, the location in the pile of course being selected to give the desired type and intensity of radiation. The application of the radiant energy may be used either in a batch or a flow-type process.

The support for the oxides of platinum, titanium or chromium is alumina or silica-alumina. The natural or synthetic aluminas may be used but highly preferred aluminas are eta-alumina and other activated or gamma family aluminas such as those derived by calcination of amorphous hydrous alumina, alumina monohydrate, alumina trihydrate or their mixtures.

An advantageous activated or gamma-type alumina can be made by calcining a precursor predominating in alumina trihydrate. Such an alumina is disclosed in U.S. Patent No. 2,838,444. The alumina base is derived from a precursor alumina hydrate composition containing about 65 to 95 weight percent of one or more of the alumina trihydrate forms, gibbsite, bayerite I and bayerite II (randomite) as defined by X-ray diffraction analysis. The substantial balance of the hydrate is amorphous hydrous or monohydrate alumina. Trihydrates are present as well-defined crystallites, that is, they are crystalline in form when examined by X-ray diffraction means. The crystalline size of the precursor alumina trihydrate is relatively large and usually is in the 100 to 1000 Angstrom unit range. The calcined alumina has a large portion of its pore volume in the pore size range of about 100 to 1000 Angstrom units generally having about 0.1 to about 0.5 volume in this range. As described in the patent the calcined catalyst base can be characterized by large surface area ranging from about 350 to about 550 or more square meters/gram when in the virgin state as determined, for example, by the BET adsorption technique.

A low area catalyst base prepared by treating the predominantly trihydrate base precursor is described in U.S. Patent No. 2,838,445. This base when in the virgin state has substantially no pores of radius less than about 10 Angstrom units and the surface area of the catalyst base is less than about 350 square meters/gram and most advantageously is in the range of about 150 to 300 square meters/gram.

The silica-alumina base of the catalyst of the present invention may include a minor amount of alumina, for instance, about 1 to 48, preferably about 10 to 25 weight percent alumina based on the silica-alumina. Catalyst of very low silica content may also be utilized for instance the so-called Uvergel alumina catalysts which usually contain less than about 10 weight percent silica. Suitable silica-aluminas include, for instance, those disclosed in U.S. Patents Nos. 2,384,505 and 2,542,190; clay catalysts and acidic solid oxide hydrocarbon cracking catalysts. The base can include minor amounts of other ingredients such as promoters, particularly acidic oxide promoters, for example metal oxides such as magnesia and boria, the total amount of such promoters generally not exceeding about 10 percent by weight, for instance about 0.1 to 5 weight percent. The preferred silica-alumina based catalysts are the synthetic gel type silica-alumina, such as coprecipitated on silica. Popular synthetic gel cracking catalysts generally contain about 10 to 30% alumina. Two such catalysts are "Aerocat" which contains about 13% $Al_2O_3$, and "High Alumina Nalcat" which contains about 25% $Al_2O_3$, with substantially the balance being silica. The catalysts may be only partially of synthetic material; e.g. as may be made by precipitation of silica-alumina on an activated clay. One example of such catalysts contains about equal amounts of silica-alumina gel and clay.

The metal component can be added to the catalytic support by known procedures, involving for instance, impregnation using a water-soluble salt of the catalytic component or by precipitation of the salt. The metal component upon further treatment, as for example by calcining in the presence of oxygen, can be converted to the metal oxide. Suitable water-soluble titanium salts are the titanium halides, titanium lactate and titanium oxalate. Chloroplatinic is the preferred water-soluble platinum salt. Suitable water-soluble chromium compounds include chromium nitrate, chromic acid, chromic sulfate and chromium chloride. When employing the impregnation procedure the resulting impregnated product can be dried, generally at a temperature within the range of about 170° F. to 400° F. for at least 6 hours and up to 24 hours or more with a stream of air circulated to carry off the water vapor. The dried catalyst mixture then may be formed by a tabletting or extruding operation. If the catalyst is to be in finely divided form, a grinding operation may follow drying. In the case of tabletting, it is customary to incorporate a die lubricant which advantageously is organic and can be burned out by oxidation in the calcination step.

The dried pellets are suitable for activation by high temperature treatment or calcination at a temperature between about 500° F. and about 1500° F., usually between about 700° F. and 1000° F., for instance, for a period of between about 2 and about 36 hours. It is generally preferred that the calcining operation be conducted in a manner minimizing contact time of the alumina-containing composite with water vapor at the high temperatures encountered. The product after drying generally contains a substantial amount of water which is driven off at temperatures above about 400° F. While the calcination or heat treatment will generally be conducted in air, it may be desirable to carry out the calcination initially in a blend of air and nitrogen. The alumina or silica-alumina support impregnated with the catalytically active component, is finally cooled to yield the finished product.

The polymerization conditions may be adjusted to carry out the polymerization of ethylene in either the liquid or vapor phase. The temperature can vary over a wide range extending from about 70° F. or lower up to about 500° F. or more, preferably about 150 to about 300° F. As temperatures increase the molecular weight of the product tends to decrease. Suitable pressures are employed to maintain a desired concentration of ethylene at a given temperature and otherwise to govern phase relationships within the reaction zone. Polymerization can be conducted at pressures ranging from one atmosphere or even less up to the maximum pressure which the selected reaction equipment can withstand, for example 30,000 p.s.i.g. or more. A preferred pressure range is about 15 to 1000 p.s.i.g. Hydrocarbon or other suitable diluents known to those in the art may be used. Suitable hydrocarbon diluents are: pentane, hexane, heptane, cyclohexane, methylcyclohexane, benzene, toluene, xylene and the like. The product can be a solid especially when lower temperatures (below 300° F.) are used, and often has a molecular weight in the range of about 2,000 to 1,000,000 or more. At low pressures and especially at high temperatures or a combination of the two, liquid polymers may be obtained. The amount of catalyst employed is sufficient to give the desired catalytic effect, for instance from a minor amount of the ethylene to 2 to 3 or more times the ethylene in a batch system. In a continuous operation the space velocity may be, for instance about 1 to 20 WHSV. It is preferred in the present invention to obtain normally solid polymers of thermoplastic nature.

While mixtures of ethylene with minor amounts of other vinyl type monomers especially propylene can be converted, it is preferred to convert substantially pure ethylene. Ethylene can be obtained in any convenient manner known to the art, such as high temperature cracking of hydrocarbons.

After being irradiated, the polymeric product can be treated as desired after it has been recovered from the catalyst by conventional methods known to the art. The polymer may be washed and dried as desired. Unreacted olefin, if any, can be recovered and recycled. The presence of water, and/or sulfur- and/or nitrogen-containing compounds in the olefin feed should be avoided by removing by commercially known purification processes.

The following specific examples will serve to illustrate the process of the present invention.

CATALYST BASES

*Alumina.*—The base aluminas employed in the examples are designed E and N. Alumina E was an eta-alumina extruded into 1/16" pellets and had a surface area of 500 m.²/g. and a pore volume of 0.5 ml./g. Alumina N was a gamma alumina extruded into 1/16" pellets and had a surface area of 269 m.²/g. and a pore volume of 0.79 ml./g.

*Silica-Alumina-H.*—This silica-alumina base is a commercial cracking catalyst prepared by the Houdry Company. This catalyst base was in the form of 1/8" pellets having a surface area of 254.2 m.²/g. and a density of .622 g./cc. The base analyzed 87.2% silicon dioxide and 11.8% alumina.

*Carbon-C.*—The carbon base was a coconut charcoal having a mesh size of 4 to 14.

*Silica-D.*—The silica gel was commercial grade prepared by the Davison Chemical Company and had a mesh size of 28 to 200.

CATALYST PREPARATION

In Table I, the catalysts which contained copper, chromium, zinc, manganese, nickel, cobalt and iron were prepared by absorbing the metal nitrate in aqueous solution on the alumina base. In preparing the titanium, vanadium, and platinum catalysts, the salts that were used to impregnate the alumina or silica-alumina base included chloroplatinic acid, rhodium chloride, titanium lactate, titanium tetrachloride in methylcyclohexane and ammonium vanadate. The carbon-based catalyst was treated with hydrogen sulfide to convert the platinum to the sulfide. This catalyst was then calcined for 3 hours in nitrogen at a temperature of about 900° F. The other catalysts were dried at 300° F. and then calcined for about 2 hours in air at a temperature of about 900° F. The catalysts were then cooled and charged to the reaction vessel with no further treatment. The weight percent of metal component can be found in Table I, presented below.

Examples I–XXVIII

The examples were conducted according to the following procedure. The polymerization of ethylene was conducted in a 100 ml. stainless steel pressure bomb. The solid catalyst was charged to the bomb. The bomb was evacuated of oxygen by purging it with an inert material, such as nitrogen. Purified ethylene was pressured into the bomb i.e. under pressures of up to about 1000 p.s.i.g. or more. The bomb was then sealed and placed in a circular rack in a radiation cave. In Run 28 a mixture of ethylene and propylene was used and the analysis of the recovered product showed that it was a copolymer of ethylene and propylene. A cobalt-60 gamma ray source was placed in the center of the circular rack. The dose rate was $2.2 \times 10^5$ REP per hour for each run except for one run conducted at dose rate of $5 \times 10^4$ REP per hour (Run 1) and another conducted at a dose rate of $6 \times 10^5$ REP per hour (Run 15). The temperatures during radiation varied between about 70 to 185° F. No heat was applied at any time during the examples. The maximum temperature was the temperature the bomb attained from the heat liberated in the polymerization. The initial pressures varied from about 440 to 1000 p.s.i.g.

The irradiation was usually continued until the ethylene pressure was reduced to zero except in those runs where low polymerization rate occurred. The solid catalyst was removed from the bomb and examined for polymer. Some of the polyethylene was removed by extraction with a petroleum hydrocarbon boiling in the range of about 400° F. to 600° F. The polyethylene separated from the solution upon cooling. Several extractions were necessary to remove a substantial proportion of the polyethylene retained within the catalysts to obtain polyethylene for physical tests. The determination of the presence of low molecular weight polymers was carried out by sampling the residual gas and analyzing for hydrocarbons in the gasoline boiling range by the mass spectrograph. A wax-like polymer having a density (24/4° C.) of 0.955 and a softening point of 115° C. was recovered in Runs 1, 2, 13 and 19.

Table I, presented below, lists the catalytic materials that were tested, the radiation dosage of each run, the number of hours the reaction was subject to radiation, the weight of polymer recovered and the temperature and pressure conditions of each run. Also presented in Table I are G values which were determined by multiplying the total weight of all material charged to the reaction vessel by the dose rate per hour. This figure was in turn multiplied by 93 and the number of hours the reaction was subject to the radiation. This value was then converted from ergs to units of 100 electron volts and divided into the number of molecules of ethylene which polymerized to give the G value for the ethylene converted to the polymer.

TABLE I.—ETHYLENE POLYMERIZATION WITH SOLID CATALYST AND GAMMA RADIATION

| Examples— Run No. | Description of Catalyst | | | | | Grams | |
|---|---|---|---|---|---|---|---|
| | Metal | State | Base | Type | Percent Metal | Ethylene | Catalyst |
| 1 | Platinum | Oxide | Alumina | E | .6 | 16.5 | 85 |
| 2 | do | do | do | E | .6 | 20 | 85.5 |
| 3 | do | do | do | E | .35 | 16 | 80.5 |
| 4 | do | do | do | E | | 18 | 85 |
| 5 | Copper | Oxide | do | E | 1 | 16 | 84 |
| 6 | Zinc | do | do | E | 1 | 15 | 85 |
| 7 | Manganese | do | do | E | 1 | 15 | 84 |
| 8 | Vanadium | do | do | E | 1 | 16 | 82 |
| 9 | Nickel | do | do | E | 1 | 15 | 85 |
| 10 | Cobalt | do | do | E | 1 | 16 | 82 |
| 11 | Iron | do | do | E | 1 | 14 | 82 |
| 12 | Titanium | do | do | E | 1 | 15 | 84 |
| 13 | do | do | do | N | 5 | 20 | 67 |
| 14 | | do | do | N | | 16 | 57 |
| 15 | Platinum | Oxide | do | E | 0.6 | 16 | 84 |
| 16 | Copper | Metal | do | E | 1 | 15 | 81 |
| 17 | | | Silica Alumina | H | | 20 | 68 |
| 18 | Platinum | Oxide | do | H | 1 | 20 | 66 |
| 19 | Titanium | do | do | H | 5 | 18 | 55 |
| 20 | Platinum | Metal | do | H | 2 | 15 | 63 |
| 21 | do | Sulfide | Carbon | C | 4 | 18 | 37 |
| 22 | | | Silica Gel | D | | 15 | 70 |
| 23 | No Catalyst | | | | | 12 | None |
| 24 | Titanium | Oxide | None | | 60 | 15 | 68 |
| 25 | Platinum | do | Silica Gel | D | 1 | 17 | 81 |
| 26 | do | do | Carbon | C | 2 | 17 | 50 |
| 27 | Titanium | Tetrachloride | Alumina | N | 5 | c 18 | 68 |
| 28 | Platinum | Oxide | Silica Alumina | H | 2 | d 26 | 60 |

Footnotes at end of table.

TABLE I.—Continued

| Examples—Run No. | Total Dose REP | Hours of Radiation | Polymer Weight | Temperature of Run Initial | Temperature of Run Max. | Pressure, p.s.i.g. Initial | Pressure, p.s.i.g. Final | G Value |
|---|---|---|---|---|---|---|---|---|
| 1 | 4 | a 10⁵ | 8 | 16.5 | 81 | 95 | 790 | 0 | 15,100 |
| 2 | 8.25 | 10⁵ | 3.75 | 20 | 68 | 137 | 905 | 0 | 8,540 |
| 3 | 13.2 | 10⁵ | 6 | 16 | 81.5 | 103 | 718 | 0 | 4,650 |
| 4 | 52.8 | 10⁵ | 24 | 15 | 78 | 83 | 855 | 200 | 1,000 |
| 5 | 39.6 | 10⁵ | 18 | 8 | 77 | 84 | 730 | 490 | 1,500 |
| 6 | 52.8 | 10⁵ | 24 | 15 | 73 | 87 | 740 | 0 | 1,000 |
| 7 | 101 | 10⁵ | 46 | 3.5 | 75 | 80 | 740 | 610 | 128 |
| 8 | 101 | 10⁵ | 46 | 13 | 77 | 86 | 730 | 120 | 485 |
| 9 | 17.6 | 10⁵ | 8 | 15 | 73 | 97 | 730 | 0 | 3,150 |
| 10 | 52.8 | 10⁵ | 24 | 16 | 73 | 90 | 730 | 0 | 1,145 |
| 11 | 59.5 | 10⁵ | 27 | 9.5 | 82 | 85 | 750 | 240 | 620 |
| 12 | 24.2 | 10⁵ | 11 | 15 | 78 | 100 | 740 | 0 | 2,300 |
| 13 | 4.4 | 10⁵ | 2 | 20 | 77 | 166 | 950 | 0 | 19,300 |
| 14 | 88 | 10⁵ | 40 | 13 | 75 | 84 | 790 | 100 | 746 |
| 15 | 12 | 10⁵ | 2 | 16 | 79 | 152 | 760 | 0 | 5,100 |
| 16 | 190 | b 10⁵ | 90 | 14 | 85 | 85 | 750 | 40 | 272 |
| 17 | 22 | 10⁵ | 10 | 20 | 55 | 109 | 900 | 0 | 3,800 |
| 18 | 4.4 | 10⁵ | 2 | 19 | 72 | 142 | 930 | 60 | 18,300 |
| 19 | 4.4 | 10⁵ | 2 | 18 | 72 | 183 | 995 | 150 | 20,500 |
| 20 | 42 | 10⁵ | 19 | 10 | 76 | 76 | 440 | 110 | 1,200 |
| 21 | 308 | 10⁵ | 140 | 7 | 84 | 84 | 865 | 680 | 153 |
| 22 | 52.8 | 10⁵ | 24 | 13 | 84 | 84 | 725 | 10 | 765 |
| 23 | 898 | 10⁵ | 408 | 4 | 80 | 80 | 760 | 525 | 137 |
| 24 | 264 | 10⁵ | 120 | 4 | 80 | 80 | 910 | 770 | 67 |
| 25 | 52.8 | 10⁵ | 24 | 5 | 78 | 82 | 735 | 550 | 335 |
| 26 | 52.8 | 10⁵ | 24 | 1 | 80 | 80 | 850 | 800 | 104 |
| 27 | 52.8 | 10⁵ | 24 | 6 | 75 | 77 | 620 | 510 | 282 |
| 28 | 6.6 | 10⁵ | 3 | 31 | 85 | 121 | 445 | 170 | 12,000 | a Low dose example.
b High does example.
c In 32 grams methylcyclohexane.
d With 30 grams propylene.

As will be seen from these runs a high rate of ethylene polymerization was found to occur when a specific metal oxide, i.e. platinum or titanium, on an alumina or silica-alumina base was employed as a catalyst with a low total dosage of gamma radiation as indicated by the G values. Runs 4, 14, 17 and 22 show the effect of the various base supports without any catalytic metal. Thus from these values it is easily determined if a particular metal or metal oxide has enhanced the ethylene polymerization rate. From the data presented in the column for G values, it can be readily seen that the oxides of platinum and titanium on alumina or silico-alumina are superior catalyst to the other metal oxides in the presence of gamma radiation in the polymerization rate of ethylene. Run 1 was conducted at a dose rate of about 25% lower than the other runs. This result shows that a low dose of gamma radiation is very effective in improving the rate of polymerization and the efficiency, as indicated by a high G value, in the utilization of the radiation energy. Run 15 was conducted at a dose rate approximately 3 times the dose level of the other runs. This G value indicates that the larger dose of radiation energy is not being utilized as efficiently as at the lower dose levels. A comparison of runs 18 and 20 shows that a reduced metal is a poor polymerization catalyst compared to the metal oxide. Run 21 illustrates that platinum sulfide on a carbon base is ineffective as a polymerization catalyst. Run 24 illustrates that titanium oxide, not in combination with an alumina or silica-alumina base was inactive as a catalyst. Runs 25 and 26 illustrate that when platinum oxide is not in combination with alumina or silica-alumina, it is not an effective polymerization catalyst. Run 27 illustrates that titanium tetrachloride on alumina is not an effective polymerization catalyst and gives a G value less than when pure alumina was used alone (Runs 4 and 14). Run 28 illustrates that propylene will effectively co-polymerize with ethylene as indicated by a high G value.

*Examples XXIX–XXXIII*

Runs 29 and 30 using chromia on alumina and silica-alumina and rhodium on alumina were conducted under substantially the same conditions as indicated in Example I to XXVIII. Table II, presented below, presents pertinent data from these runs. Also presented in Table II are comparative runs 31 and 32 using chromia on alumina and silica-alumina conducted in the absence of radiation ionization.

TABLE II.—ETHYLENE POLYMERIZATION WITH SOLID CATALYST AND GAMMA RADIATION

| Examples—Run No. | Description of Catalyst | | | | | Grams | |
|---|---|---|---|---|---|---|---|
| | Metal | State | Base | Type | Percent Metal | Ethylene | Catalyst |
| 29 | Chromium | Oxide | Alumina | E | 1 | a 12 | 40 |
| 30 | do | do | Silica-Alumina | H | 2.5 | b 14 | 40 |
| 31 | do | do | Alumina | E | 1 | c 5.5 | 45 |
| 32 | do | do | Silica-Alumina | H | 2.5 | d 14 | 80 |

Footnotes at end of table.

TABLE II.—Continued

| Examples—Run No. | Total Dose, REP | Hours of Radiation | Polymer Weight | Temperature of Run Initial | Temperature of Run Max. | Pressure, p.s.i.g. Initial | Pressure, p.s.i.g. Final | G Value |
|---|---|---|---|---|---|---|---|---|
| 29 | $17.6 \times 10^5$ | 8 | 3 | 82 | 130 | 520 | 375 | 540 |
| 30 | $2.75 \times 10^5$ | 1.25 | 10 | 83 | 136 | 520 | 400 | 12,500 |
| 31 | | | 1.5 | | 75 | 275 | 200 | |
| 32 | | | 2 | [e] 75–100 | | 525 | 630 | |

[a] In 64 grams of n-heptane.
[b] In 53 grams of methylcyclohexane.
[c] In 53 grams of n-heptane.
[d] In 53 grams of methylcyclohexane.
[e] Temperature spontaneously to a maximum and declined immediately.

Run 31 was very slow and it proceeded for 120 hours. A comparison with Run 29 illustrates the improvement in the polymerization rate using radiation ionization with the chromium oxide catalyst. In Run 29 it was necessary to dilute the ethylene with heptane to slow the spontaneous rate of polymerization using radiation ionization in the presence of the chromia-alumina catalyst. A comparison of Run 30 and Run 32 also illustrates the significant improvement obtained in the polymerization rate when ionization radiation is employed with the chromium oxide catalyst.

It is claimed:
1. A process for the preparation of polyethylene which comprises subjecting ethylene under polymerization conditions in the presence of a catalyst consisting essentially of a catalytic amount of an oxide of a metal selected from the group consisting of platinum and titanium on a catalytic support selected from the group consisting of alumina and silica-alumina, to a high energy ionizing radiation dose of about $1 \times 10^4$ to $3 \times 10^6$ REP.
2. The process of claim 1 wherein the radiation is gamma radiation.
3. The process of claim 2 wherein the radiation dose is about $2 \times 10^5$ to $15 \times 10^5$ REP.
4. The process of claim 2 wherein the radiation dose rate is about $1 \times 10^4$ to $3 \times 10^5$ REP/hr.
5. The process of claim 4 in which the metal is platinum.
6. The process of claim 4 in which the metal is titanium.
7. The process of claim 1 in which the metal is platinum.
8. The process of claim 1 in which the metal is titanium.

References Cited by the Examiner

UNITED STATES PATENTS

| | | | |
|---|---|---|---|
| 2,825,721 | 3/1958 | Hogan et al. | 260—88.2 |
| 2,903,404 | 9/1959 | Oita et al. | 204—154 |
| 2,912,421 | 11/1959 | Juveland et al. | 260—93.7 |
| 2,951,796 | 9/1960 | Ruskin | 204—154 |
| 2,953,509 | 9/1960 | Ruskin | 204—162 |
| 3,033,844 | 5/1962 | Peters et al. | 204—154 |

MURRAY TILLMAN, *Primary Examiner.*

J. R. SPECK, *Examiner.*